(12) United States Patent
Barnidge et al.

(10) Patent No.: US 8,723,809 B1
(45) Date of Patent: May 13, 2014

(54) TOUCH PANEL SYSTEM AND PROCESS

(75) Inventors: Tracy J. Barnidge, Marion, IA (US);
Paul R. Nemeth, Cedar Rapids, IA (US); James D. Sampica, Springville, IA (US); Sandra S. Dudley, Walker, IA (US); Gary N. Prior, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1109 days.

(21) Appl. No.: 12/286,006

(22) Filed: Sep. 26, 2008

Related U.S. Application Data

(63) Continuation-in-part of application No. 12/009,375, filed on Jan. 18, 2008, and a continuation-in-part of application No. 12/009,482, filed on Jan. 18, 2008.

(51) Int. Cl.
*G06F 3/041* (2006.01)
*B32B 37/00* (2006.01)

(52) U.S. Cl.
USPC .............................. 345/173; 156/286; 156/381

(58) Field of Classification Search
None
See application file for complete search history.

(56) References Cited

U.S. PATENT DOCUMENTS

| | | | |
|---|---|---|---|
| 6,982,432 B2 * | 1/2006 | Umemoto et al. | 257/12 |
| 7,339,579 B2 * | 3/2008 | Richter et al. | 345/173 |
| 7,397,466 B2 * | 7/2008 | Bourdelais et al. | 345/173 |
| 8,540,002 B2 * | 9/2013 | Sampica et al. | 156/381 |
| 2005/0073507 A1 * | 4/2005 | Richter et al. | 345/174 |
| 2006/0214925 A1 * | 9/2006 | Taninaka et al. | 345/173 |
| 2008/0007675 A1 * | 1/2008 | Sanelle et al. | 349/96 |
| 2009/0186218 A1 * | 7/2009 | Sampica et al. | 428/343 |
| 2010/0127992 A1 * | 5/2010 | Schmid | 345/173 |

* cited by examiner

*Primary Examiner* — Andrew L Sniezek
(74) *Attorney, Agent, or Firm* — Donna P. Suchy; Daniel M. Barbieri

(57) ABSTRACT

A touch panel system and process are disclosed.
A touch panel system may include: a touch panel; and a deformable glass substrate.
A process for manufacturing a touch panel system may include one or more of the following: coupling a deformable glass substrate to a touch panel.

17 Claims, 21 Drawing Sheets

TOUCH PANEL SYSTEM AND PROCESS

CROSS-REFERENCE TO RELATED APPLICATIONS

The present application constitutes a continuation-in-part of United States Patent Application having the U.S. patent application Ser. No. 12/009,375, entitled SUBSTRATE LAMINATION SYSTEM AND METHOD, naming James D. Sampica, Paul R. Nemeth, Tracy J. Barnidge and Vincent P. Marzen as inventors, filed Jan. 18, 2008, which is currently co-pending, or is an application of which a currently co-pending application is entitled to the benefit of the filing date.

The present application constitutes a continuation-in-part of United States Patent Application having the U.S. patent application Ser. No. 12/009,482, entitled SUBSTRATE LAMINATION SYSTEM AND METHOD, naming James D. Sampica, Paul R. Nemeth, Tracy J. Barnidge and Vincent P. Marzen as inventors, filed Jan. 18, 2008, which is currently co-pending, or is an application of which a currently co-pending application is entitled to the benefit of the filing date.

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure generally relates to the field of user interfaces, and more particularly to a touch panel.

SUMMARY

A touch panel system and process are disclosed.

A touch panel system may include: a touch panel; and a deformable glass substrate.

A process for manufacturing a touch panel system may include: coupling a deformable glass substrate to a touch panel.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 9:
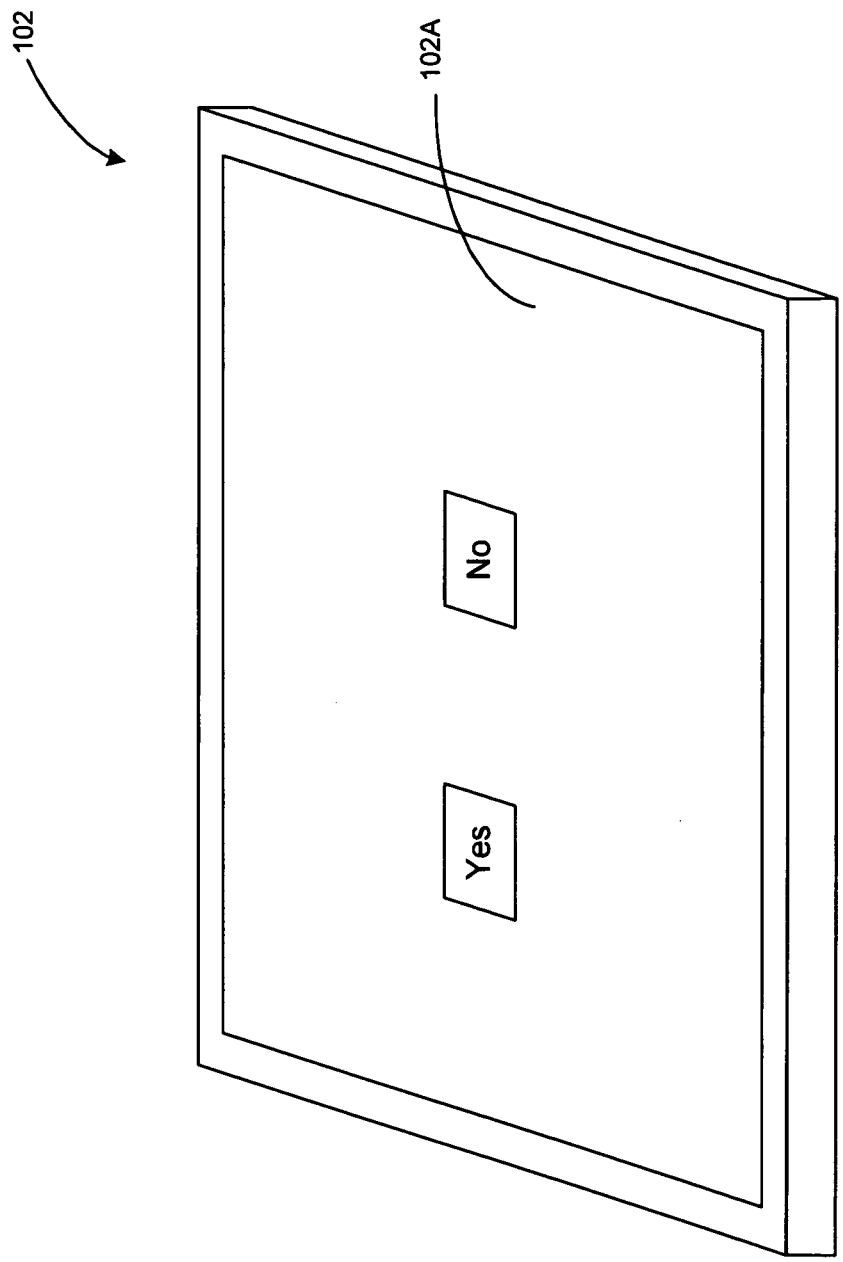
FIG. 9 is an isometric view of a touch panel.

FIG. 9 illustrates a touch panel 102. Numerous touch panels may be utilized. For example, the touch panel 102 may include touch screen monitor (e.g. an LCD, LCoS, or LED screen) for an avionics display system. The touch panel 102 may include a low-reflectance layer such as a circular polarizer 102A applied to a surface of the touch panel 102. The circular polarizer 102A may be disposed on a surface of touch panel 102. The circular polarizer 102A may be a circular polarizing layer comprising a linear polarizer layer 102A-1 and a quarter wave retarder layer 102A-2. The linear polarizer layer may comprise one or more polymeric organic film layers (e.g. a triacetate cellulose layer, a polyvinyl alcohol layer, and the like). The quarter wave retarder layer may comprise a polymeric film. The circular polarizer 102A may be operably coupled to the touch panel 102 by an adhesive layer 102B, such as pressure-sensitive adhesive layer.

The surface of the circular polarizer 102A may be sensitive to abrasion, scratches, and moisture due to having a relatively soft, permeable surface if comprised of certain polymeric organic films. Further, the ability to apply robust mechanical, chemical and/or optical treatments (e.g. anti-glare, anti-reflective and anti-smudge treatments) to the touch panel 102 may be limited due to the lower temperature processing which may be required for such plastic films relative to other materials, such as glass.

Figure 10:
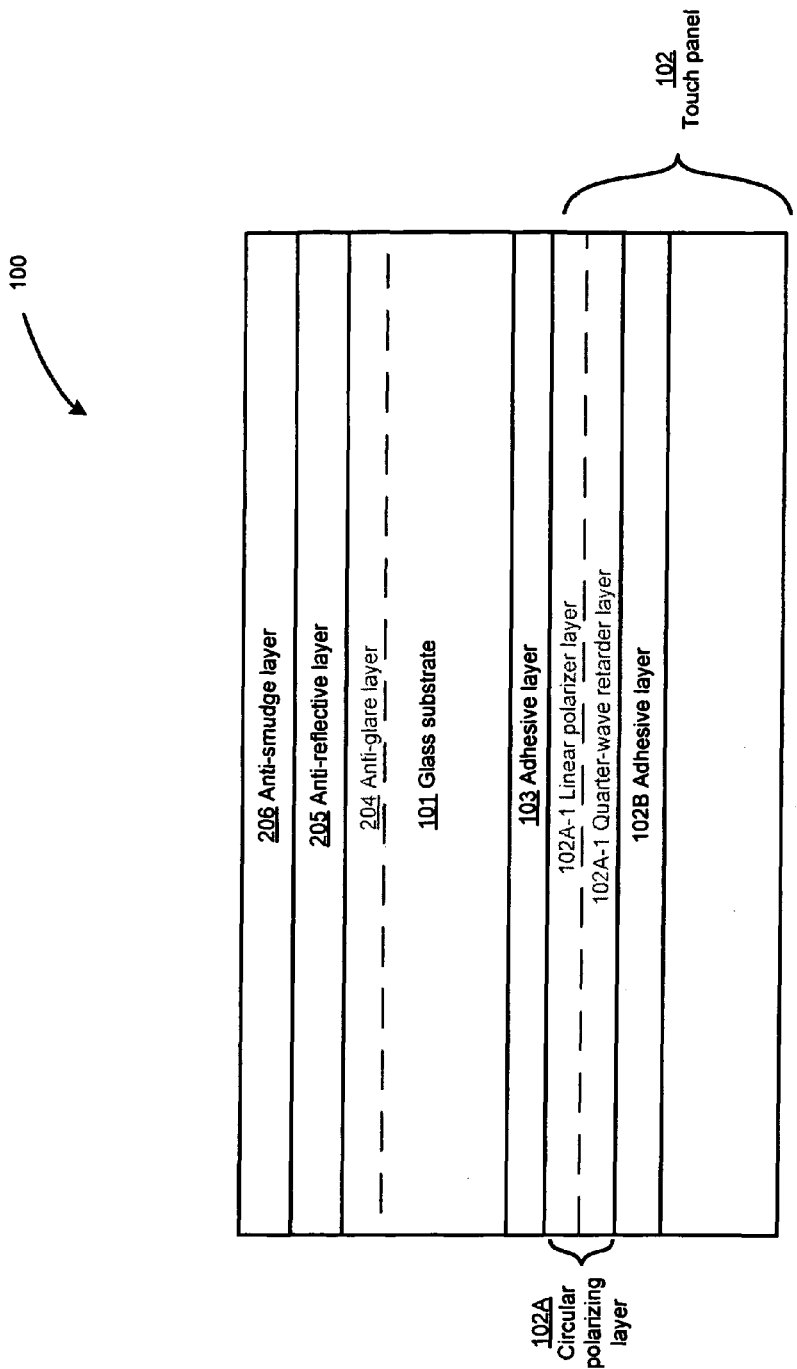
FIG. 10 is an cross-sectional view of a touch panel system.

FIG. 10 illustrates a touch panel system 100. The touch panel system 100 may include a deformable glass substrate 101 which may be coupled to a touch panel 102.

The deformable glass substrate 101 may be coupled to the touch panel 102 by an adhesive layer 103 (e.g. a pressure sensitive adhesive layer). The deformable glass substrate 101 may be coupled to the touch panel 102 by a substrate lamination methodology such as that described in U.S. patent application Ser. No. 12/009,375 and U.S. patent application Ser. No. 12/009,482, as will be discussed below.

The deformable glass substrate 101 may be may be utilized to prevent premature wear of the touch panel 102 from repeated interfaces with finger tips, stylus points, cleaning agents, and the like. The deformable glass substrate 101 may be any type of deformable glass composition. The deformable glass substrate 101 may comprise an alumina-silicate type glass substrate and/or a soda-lime type glass substrate. Use of an alumina-silicate deformable glass substrate 101 and/or a soda-lime type deformable glass substrate 101 rather than a polyethylene terephthalate (PET) overlay may provide a more effective humidity barrier having lower water vapor permeability and lower susceptibility to harmful fluids. Further, the use of a deformable glass substrate 101 may result in increased activation life due to a reduced radius of curvature resulting from contact from finger tips, stylus points and the like.

One or more treatments may be applied to the deformable glass substrate 101. For example, a treatment may include, but is not limited to, a coating process, an etching process, a lamination process, and the like. A treatment may include, but is not limited to, an anti-glare treatment, an anti-reflective treatment, an anti-smudge treatment, and the like. The treatments may be applied prior to a lamination of the deformable glass substrate 101 to the touch panel 102 so that enhanced treatment processes (e.g. higher-temperature processing) may be utilized when treating a deformable glass substrate 101 and not a more sensitive touch panel 102. The treatments may be applied independently or in combination. A treatment may comprise one or more of a chemical, mechanical or optical treatment.

The touch panel system 100 may include an anti-glare treatment 204. Numerous anti-glare treatments may be applied to the deformable glass substrate 101. For example, the anti-glare treatment 204 may be a texturized surface of the deformable glass substrate 101. The texturized anti-glare treatment 204 may created on the deformable glass substrate 101 utilizing a mechanical and/or chemical etching process. The anti-glare treatment 204 of the deformable glass substrate 101 may be less than or equal to approximately 1.1 millimeters thick. The coating properties of the anti-glare treatment 204 may be enhanced by the use of higher temperature processing techniques permitted by the more robust nature of the deformable glass substrate 101 as compared to other lower-temperature processing required for various plastic substrates, such as PET.

The touch panel system 100 may include an anti-reflective treatment 205. Numerous anti-reflective layers may be applied to the deformable glass substrate 101. For example the anti-reflective treatment 205 may include a Magnesium Fluoride (MgF2) or Silicone Dioxide (SiO2) layer. The anti-reflective treatment 205 may be applied to the deformable glass substrate 101 by numerous processes. For example, the anti-reflective treatment 205 may be applied to the deformable glass substrate 101 by a chemical vapor deposition process.

The touch panel system 100 may include an anti-smudge treatment 206. Numerous anti-smudge treatments may be applied to the deformable glass substrate 101. For example, the anti-smudge treatment 206 may include a hydrophobic coating and/or an oleophobic coating.

The deformable glass substrate 101 may be laminated to the touch panel 102 utilizing an adhesive layer 103. The adhesive layer 103 may be an optically clear adhesive layer (e.g. a cured-state polymer-based pressure sensitive adhesive composition such as an acrylic or silicone based polymer). The deformable glass substrate 101 may be laminated to the touch panel 102 utilizing a rigid-to-rigid lamination process as described below.

Figure 1:
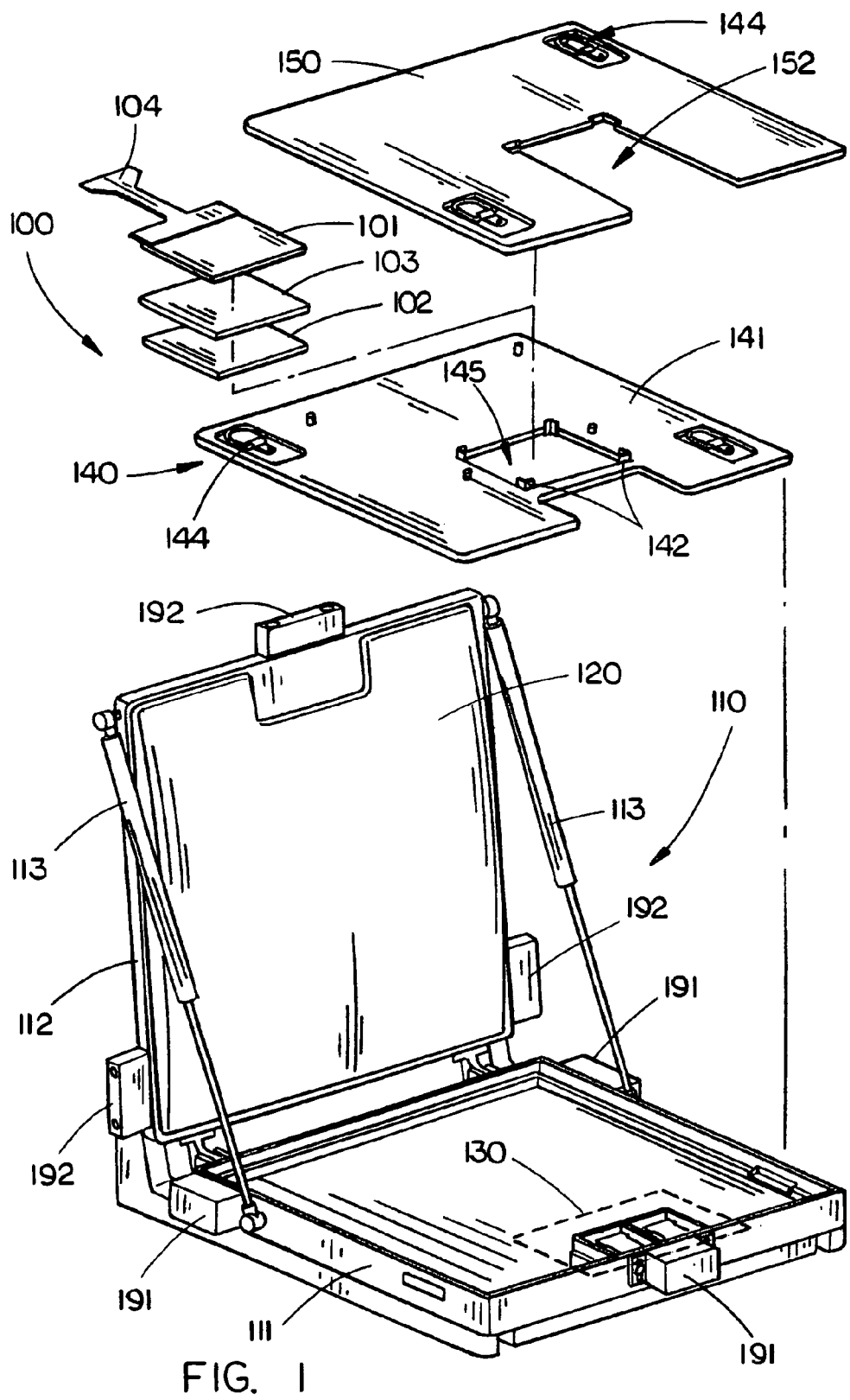
FIG. 1 is an isometric view of a substrate lamination system.
Figure 8:
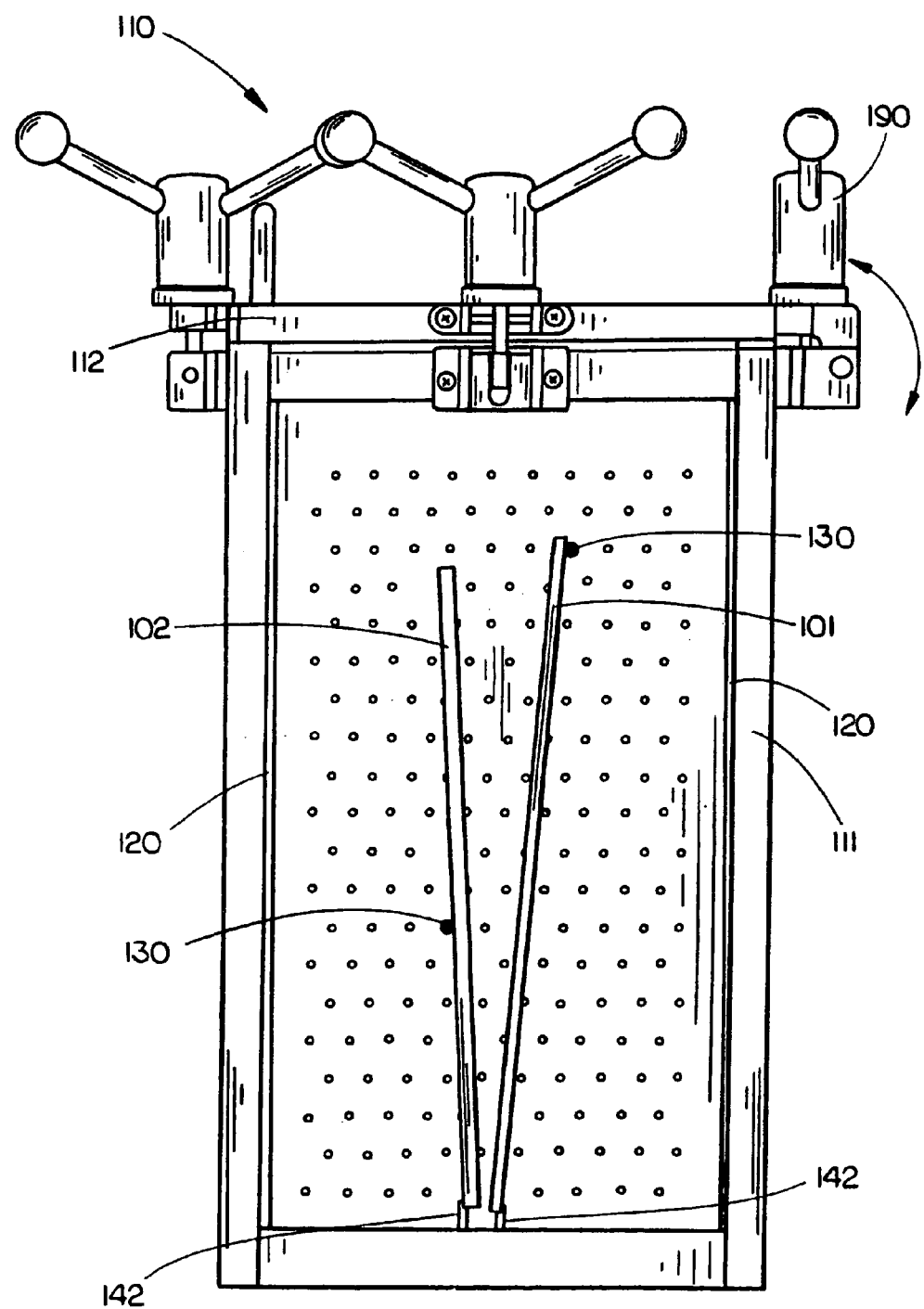
FIG. 8 is a cross-sectional view of a substrate lamination system.

FIGS. 1 and 8 illustrate example systems in which one or more rigid-to-rigid lamination processes may be employed. A lamination system 100 may comprise a vacuum chamber 110, at least one flexible membrane 120, and a substrate support 130.

The vacuum chamber 110 may be any container which is capable of being sealed so as to separate a space interior to the vacuum chamber 110 from a space exterior to the vacuum chamber 110. For example, the vacuum chamber 110 may be a generally rectangular structure having a vacuum chamber body 111 and a vacuum chamber lid 112. The vacuum chamber 110 may be constructed of any number of materials having sufficient strength so as to maintain a vacuum such as aluminum, steel, carbon fiber, plastics, and the like.

Figure 2:
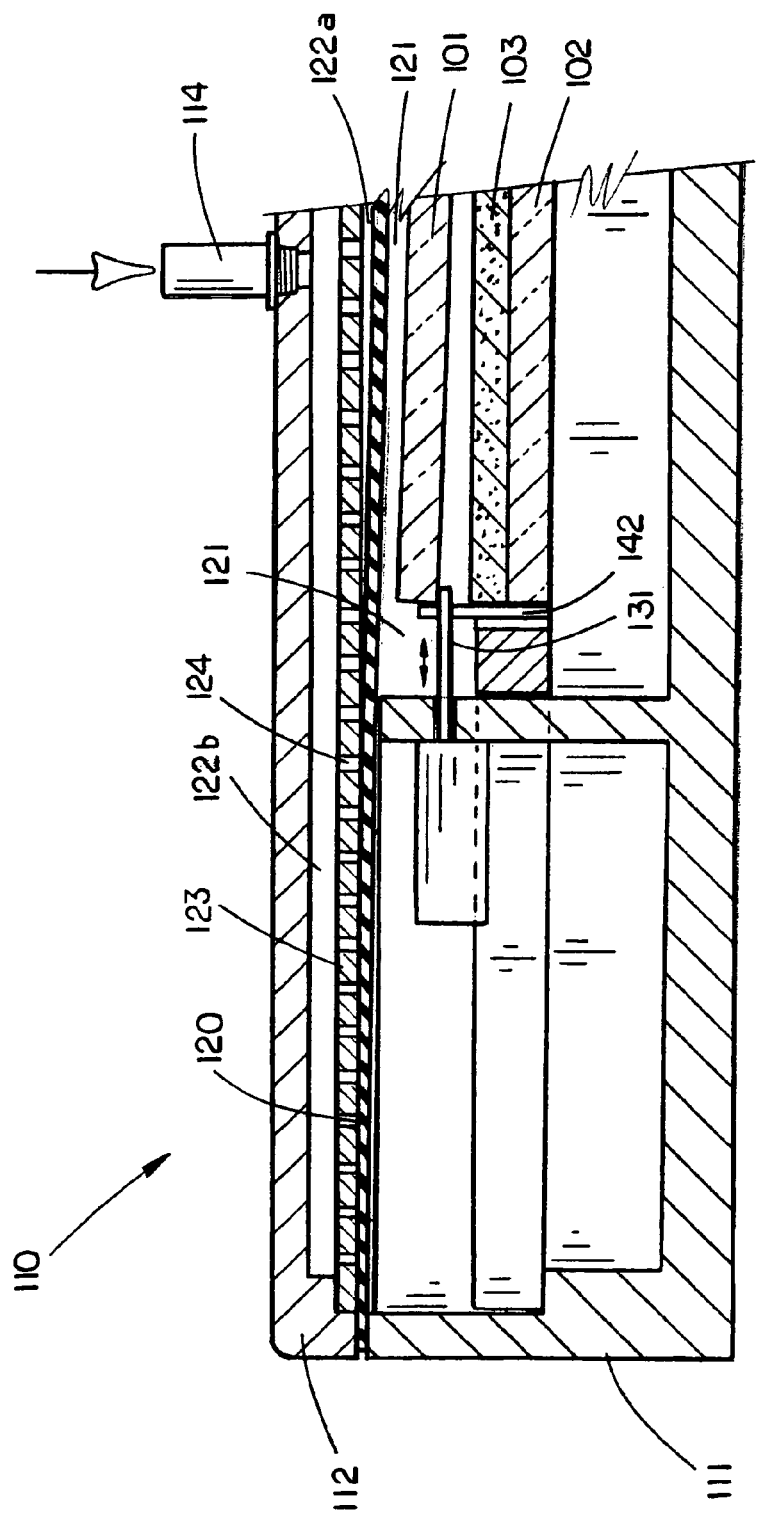
FIG. 2 is an cross-sectional view of a substrate lamination system.
Figure 3:
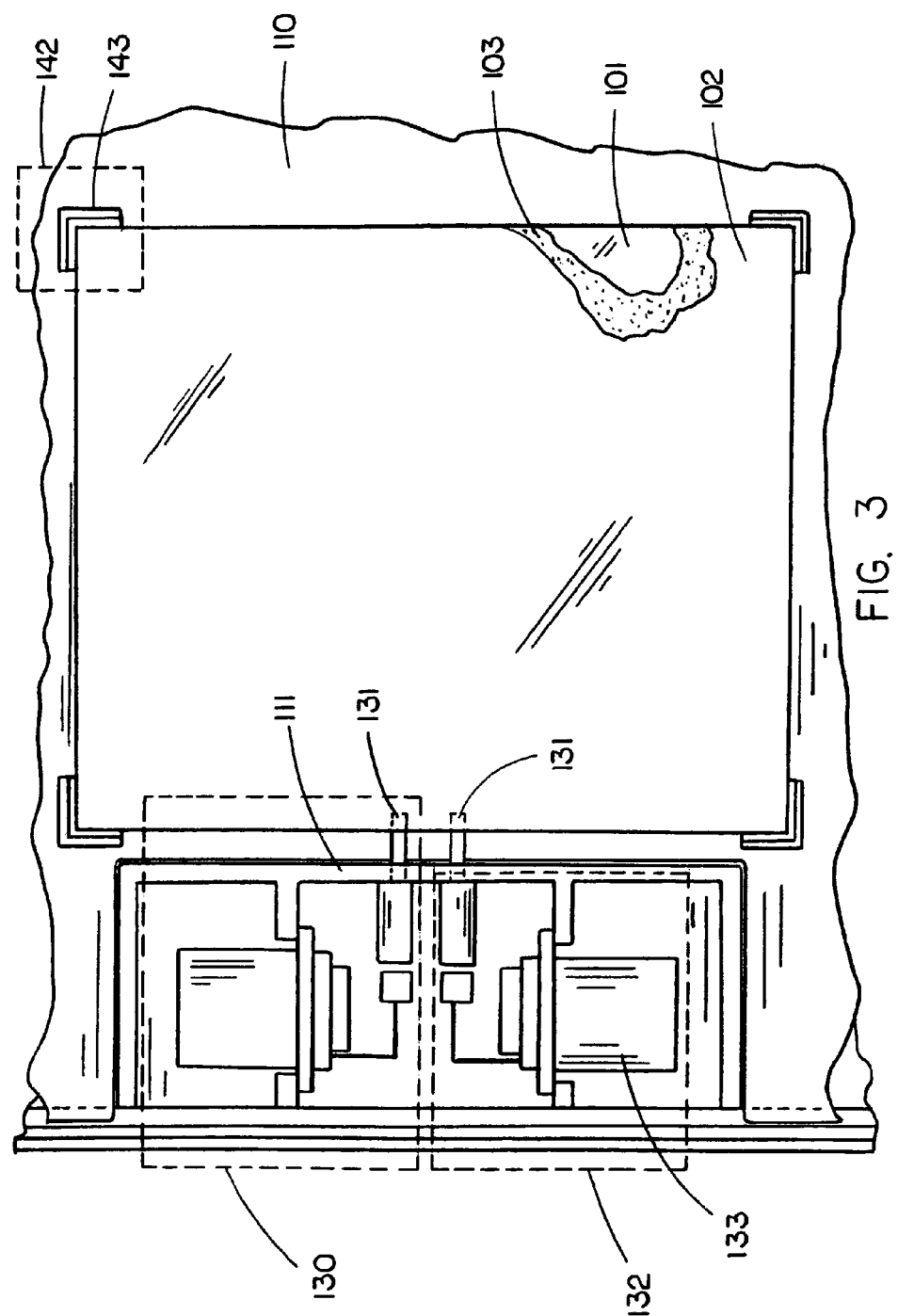
FIG. 3 top view of a substrate lamination system.

Referring now to FIG. 2, the flexible membrane 120 may be disposed within the vacuum chamber 110 so as to partition the vacuum chamber 110 into at least a first compartment 121 and a second compartment 122. For example, the flexible membrane 120 may be affixed to an underside of the vacuum chamber lid 112 by sealing the flexible membrane 120 about the periphery of the vacuum chamber lid 112 so as to partition the vacuum chamber 110 into a first compartment 121 formed by the flexible membrane 120 and the vacuum chamber body 111 and a second compartment 122 formed by the flexible membrane 120 and the vacuum chamber lid 112. In other exemplary embodiments, the flexible membrane 120 may comprise a vacuum bag (not shown) which may be disposed within the vacuum chamber 110, there by defining the first compartment 121 inside the vacuum bag and the second compartment 122 outside the bag. The vacuum bag may at least substantially surround the deformable glass substrate 101, the touch panel 102, and the adhesive layer 103 within the first compartment 121.

The second compartment 122 may comprise an expansion portion 122A and a plenum portion 122B separated by a perforated plenum diffuser screen 123. The perforated plenum diffuser screen 123 may serve to provide uniform distribution of airflow from the plenum portion 122B into the expansion portion 122A.

The flexible membrane 120 may be constructed from any flexible material capable of partitioning two compartments into separate pressure zones. For example, the flexible membrane 120 may be constructed of silicone rubber. The flexible membrane 120 may have one or more of the following physical characteristics: an elongation capacity of at least 100%; a tear strength of at least 30 psi; anti-static properties and/or an anti-static liner (e.g. polyester or polyethylene) disposed on one or more surfaces of the flexible membrane 120.

In other exemplary embodiments, the lamination system 100 may comprise at least one lid positioning mechanism 113. The lid positioning mechanism 113 may serve to maintain the vacuum chamber lid 112 in an open position with respect to the vacuum chamber body 111. The lid positioning mechanism 113 may comprise a gas cylinder mechanism as depicted in FIG. 1. In still further exemplary embodiments, the lid positioning mechanism 113 may comprise an actuated mechanism (e.g. a pneumatically actuated system, [not shown]) which may be extended or retracted manually or as part of an automated system controlled by a processing unit.

Referring now to FIGS. 3-7, the substrate support 130 may be any device/structure capable of maintaining a deformable glass substrate 101 and a touch panel 102 in spatial separation when disposed within the vacuum chamber 110. The substrate support 130 may maintain the deformable glass substrate 101 and/or the touch panel 102 in semi-horizontal positions as in FIG. 2 or in semi-vertical positions as in FIG. 8. For example, the substrate support 130 may comprise at least one retractable support pin 131. The retractable support pin 131 may be disposed within and project from a wall of the vacuum chamber body 111. The retractable support pin 131 may be operably coupled to an actuating mechanism 132. Further, the use of any number of substrate supports 130 supporting any number of substrates is fully contemplated by the presently described embodiments.

The cross-geometry of the tip of the retractable support pin 131 may be selected from any number of geometries including, but not limited to: cylindrical, square, hemispherical, trapezoidal, and the like. The geometry may be selected so as to minimize contact with a substrate while providing adequate substrate support.

Figure 7:
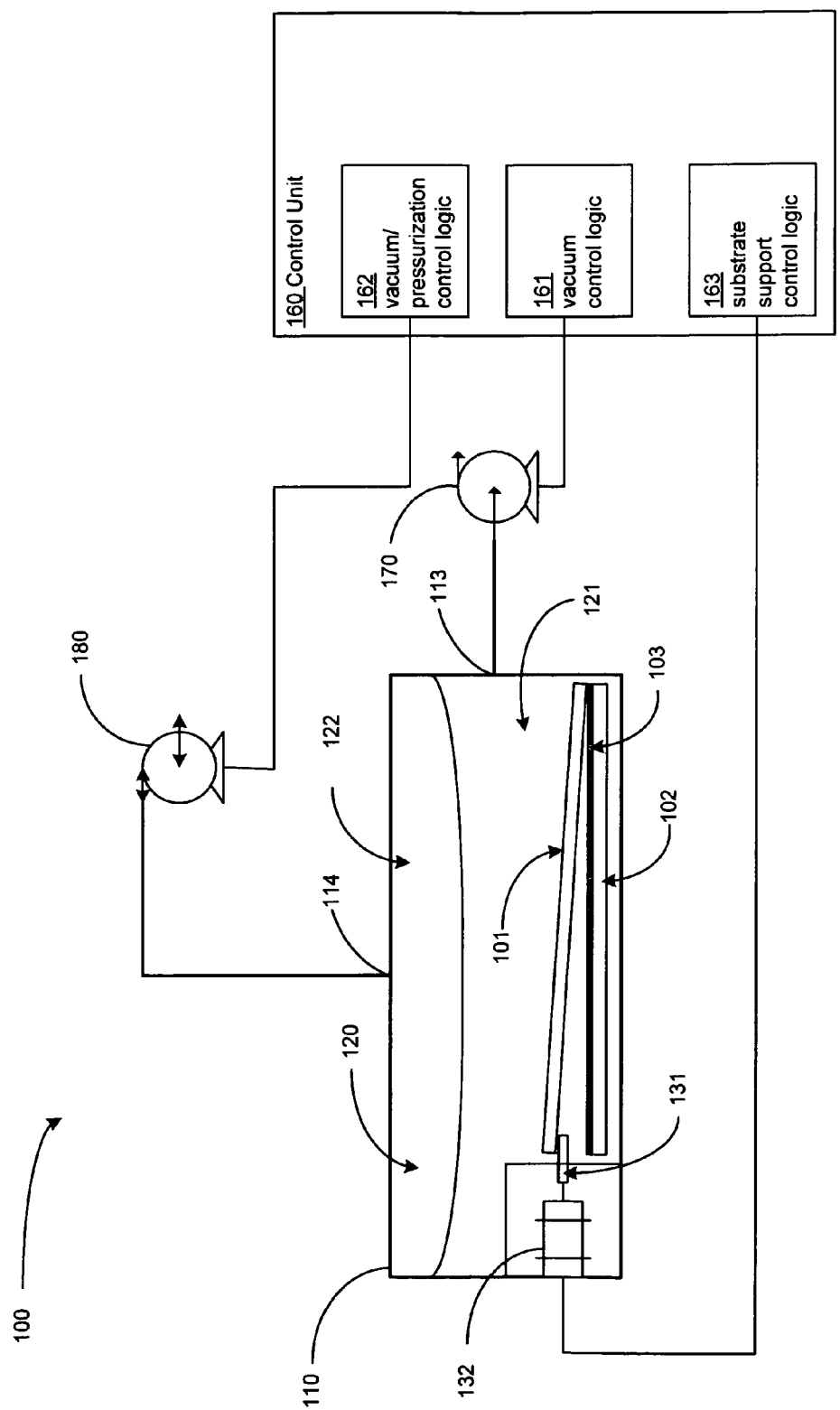
FIG. 7 an schematic view of a substrate lamination system.

The actuating mechanism 132 may comprise a motor 133 configured to translate the retractable support pin 131 in and out of the vacuum chamber 110. The operation of the motor 133 and the corresponding insertion or retraction of the retractable support pin 131 may be controlled by a control unit 160, as shown in FIG. 7.

In other exemplary embodiments, the substrate support 130 may comprise a deformable support (e.g. a foam or putty structure; a spring structure) an electromagnetic support (e.g. an electromagnet operably couplable to a metallic element), retractable air cylinder or solenoid.

The deformable glass substrate 101 and/or touch panel 102 may be rigid or semi-rigid in nature such that, when supported by the substrate support 130, the deformable glass substrate 101 and/or touch panel 102 do not deform to a degree such that they contact a layer disposed in a horizontal plane beneath the deformable glass substrate 101 and/or touch panel 102, such as an adhesive layer 103. The adhesive layer 103 may comprise commonly known acrylic or silicone based polymers.

Figure 4:
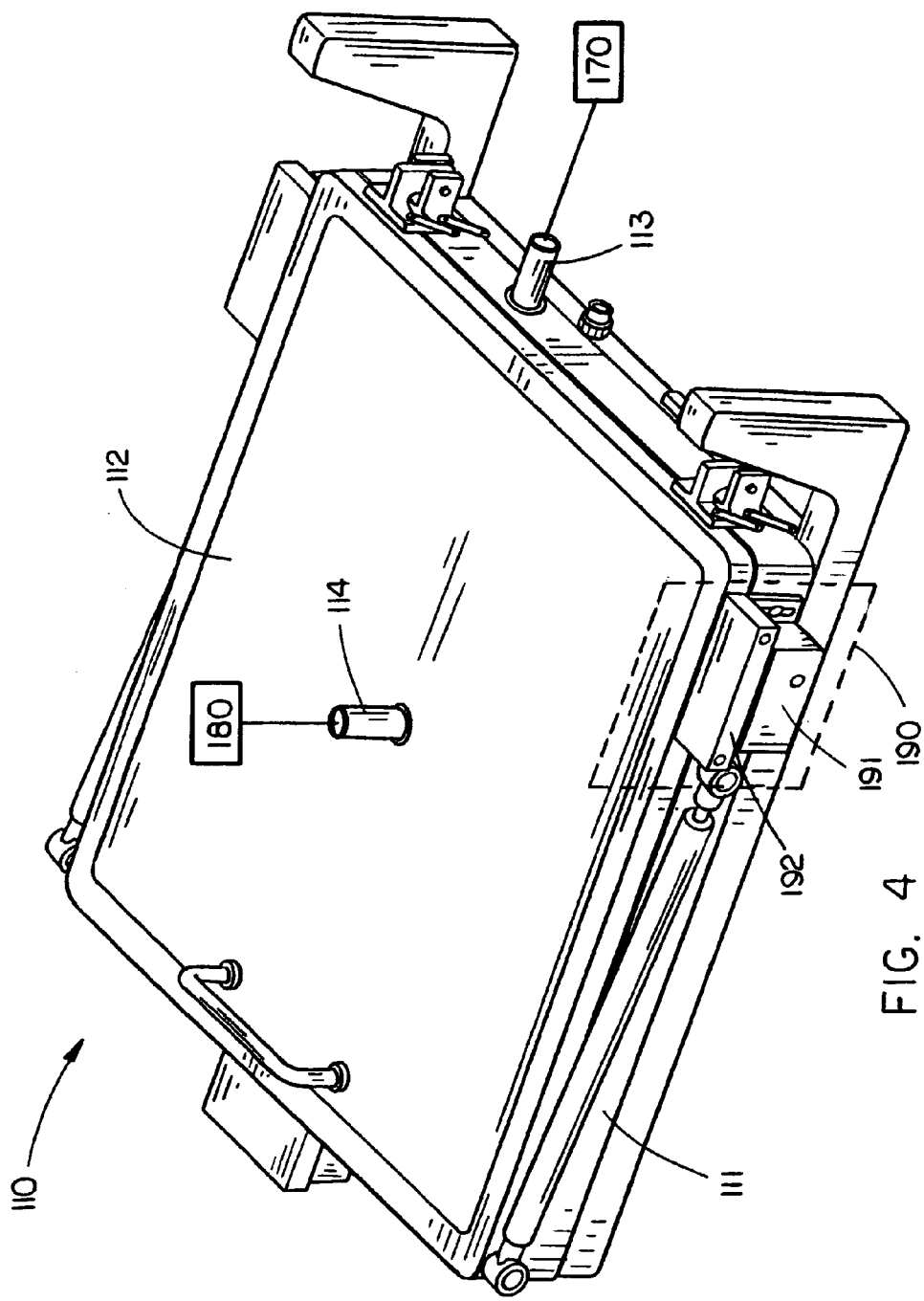
FIG. 4 is an isometric view of a substrate lamination system.
Figure 5A:
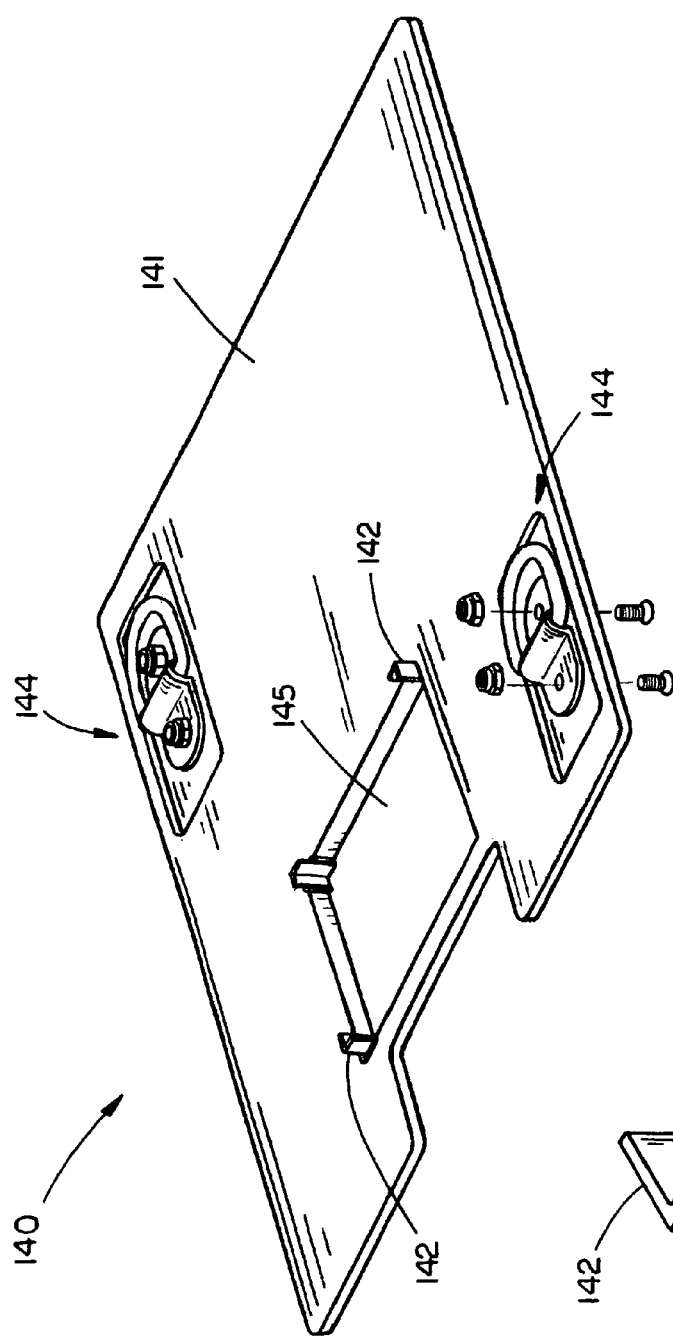
FIG. 5 is an isometric view of a substrate alignment insert.
Figure 5B:
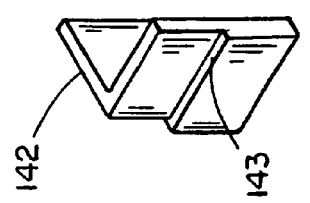

Referring to FIG. 4, the vacuum chamber 110 may further comprise a vacuum port 113 so as to provide a connection for a vacuum line (not shown) operably coupled to a vacuum pump 170. The vacuum port 113 may be operably coupled to the vacuum chamber body 111 to provide a conduit between the first compartment 121 and the vacuum pump 170.

The vacuum chamber 110 may further comprise a vacuum/pressurization port 114 so as to provide a connection for a vacuum/compressor line (not shown) operably coupled to a vacuum pump/compressor 180. The vacuum/pressurization port 114 may be operably coupled to the vacuum chamber lid 112 to provide a conduit between the second compartment 122 and the vacuum pump/compressor 180.

In still another exemplary embodiment, the lamination system 100 may comprise at least one locking mechanism 190. The locking mechanism 190 may serve to secure the vacuum chamber lid 112 to the vacuum chamber body 111 so that the interior of the vacuum chamber 110 may be evacuated. For example, locking mechanism 190 may comprise an electromagnetic lock having an electromagnet 191 and a metal element 192 operably couplable to the electromagnet so as to maintain the vacuum chamber lid 112 and the vacuum chamber body 111 in a locked position, thereby creating an adequate seal via the flexible membrane 120.

Referring again to FIG. 5, the lamination system 100 may further comprise a substrate alignment insert 140. The substrate alignment insert 140 may serve to align at least one the deformable glass substrate 101 and the touch panel 102 within the vacuum chamber 110. The substrate alignment insert 140 may comprise a base portion 141 (e.g. the floor of the vacuum chamber body 111 or a separate base layer) and at least one substrate alignment guide 142. For example, the substrate alignment guide 142 may comprise two substantially adjacent wall portions configured at a 90° angle with respect to one another and projecting from the base portion 141 so as to receive at least one substrate within the space defined by the angle of the wall portions.

In alternate exemplary embodiments, the substrate alignment guide 142 may be selected from brackets, pegs, grooves, bumps, slots, a recessed space within a body, and/or any other suitable mechanism for specifically positioning a substrate within the vacuum chamber 110.

In an alternate exemplary embodiment, the base portion 141 of the substrate alignment insert 140 may further comprise a recessed region 145 suitable for receiving at least one of the deformable glass substrate 101 and the touch panel 102.

Figure 6:
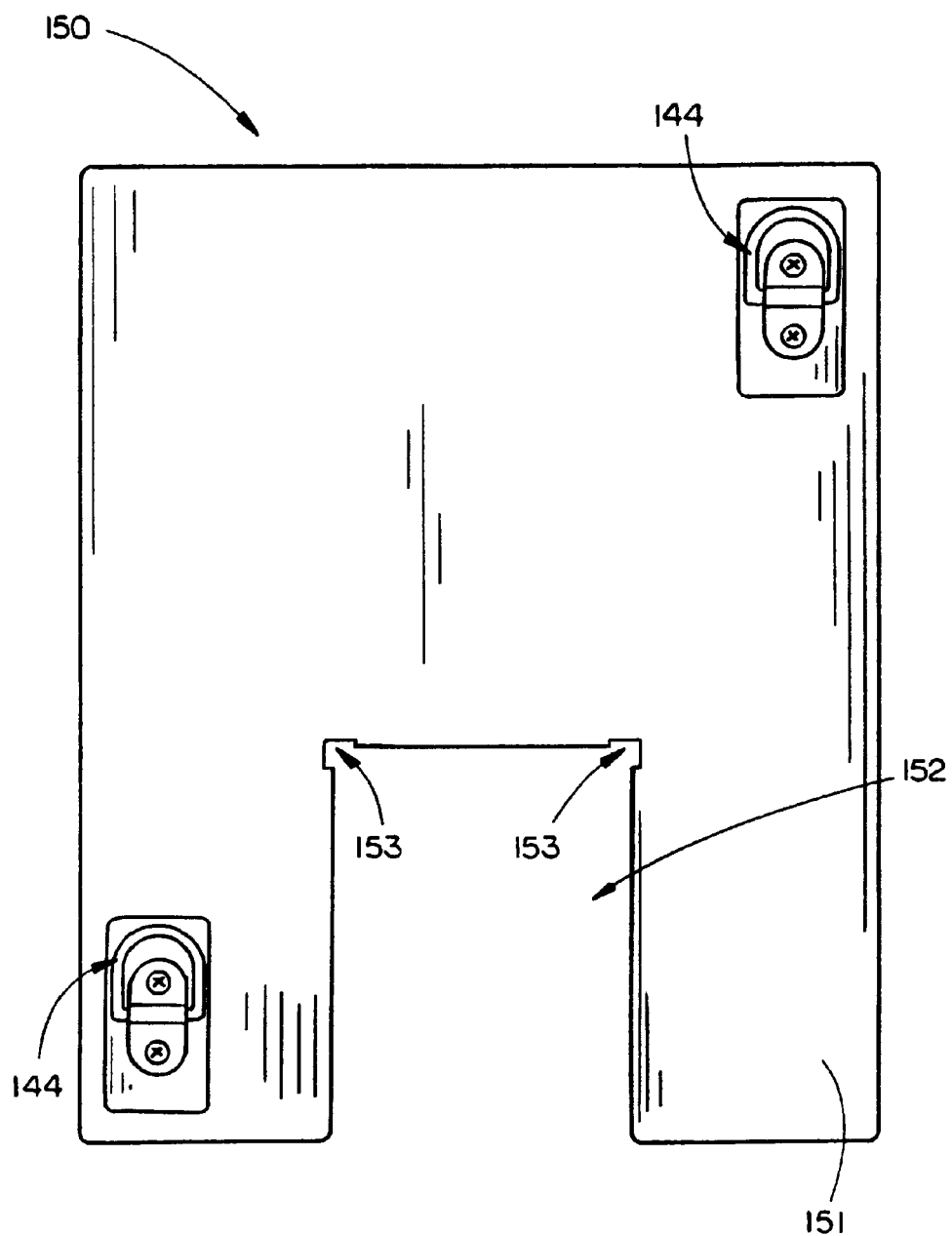
FIG. 6 is a top view of a substrate mask.

Referring to FIG. 6, the lamination system 100 may further comprise a carriage or substrate mask 150. The substrate mask 150 may comprise a substantially planar mask body 151 defining a mask aperture 152. The mask aperture 152 may be configured so as to fit around at least one substrate alignment guide 142. For example, the mask aperture 152 may comprise alignment guide aperture portions 153 may be which allow the substrate mask 150 to be secured around at least one substrate alignment guide 142. The substrate mask 150 may serve to protect portions of or the touch panel 102 which are outside the periphery of the mask aperture 152, such as flexible circuitry 104 coupled to the deformable glass substrate 101.

Referring again to FIG. 5, in an alternate exemplary embodiment, the at least one substrate alignment guide 142 may comprise a substrate mask support portion 143. The substrate mask support portion 143 may allow the substrate alignment guide 142 to support the substrate mask 150 in spatial separation from the base portion 141 when the substrate mask 150 is disposed atop the substrate alignment insert 140.

In still another exemplary embodiment, the substrate alignment insert 140 and/or the substrate mask 150 may be removable from the lamination system 100 so as to allow for the lamination of different sizes of substrates. To effectuate the removal of the substrate alignment insert 140 and/or the substrate mask 150, at least one handle member 144 may be provided.

In still further exemplary embodiments, lamination system 100 components may incorporate electrostatic discharge (ESD) prevention technologies. For example, the substrate alignment insert 140 and/or the substrate mask 150 may be constructed from materials having desirable ESD properties. Further, the substrate alignment insert 140, the substrate mask 150 and/or any other lamination system 100 component may be connected to electrical ground via ground lines. Further, the lamination system 100 components may be subjected to ionization such that charged surfaces will dissipate that charge through controlled methods. Such ionization may be conducted prior to bringing sensitive substrates, such as sensitive electronic substrates into close proximity with the lamination system 100.

Referring to FIG. 7, the lamination system 100 may further comprise a control unit 160. The control unit 160 unit may comprise vacuum control logic 161, vacuum/pressurization control logic 162 and/or substrate support control logic 163. The vacuum control logic 161, vacuum/pressurization control logic 162, and/or substrate support control logic 163 may comprise integrated logic (e.g. application specific integrated circuitry (ASIC), field programmable gate arrays (FPGA), digital signal processors (DSP)), a programmable logic controller (PLC) or one or more programs (e.g. firmware or software) configured to run on one or more processors (e.g. processors marketed by Intel® and AMD® integrated into personal computers (PCs)).

The vacuum control logic 161 may be configured to provide control signals to a vacuum pump 170 operably coupled to the vacuum chamber 110 via vacuum port 113 to create a vacuum within the first compartment 121.

The vacuum/pressurization control logic 162 may be configured to provide control signals to vacuum pump/compressor 180 operably coupled to the vacuum chamber 110 via vacuum/pressurization port 114 to create a vacuum or pressurization within the second compartment 122.

The substrate support control logic 163 may be configured to provide control signals to the actuating mechanism 132 to either insert or retract the retractable support pin 131.

Figure 11:
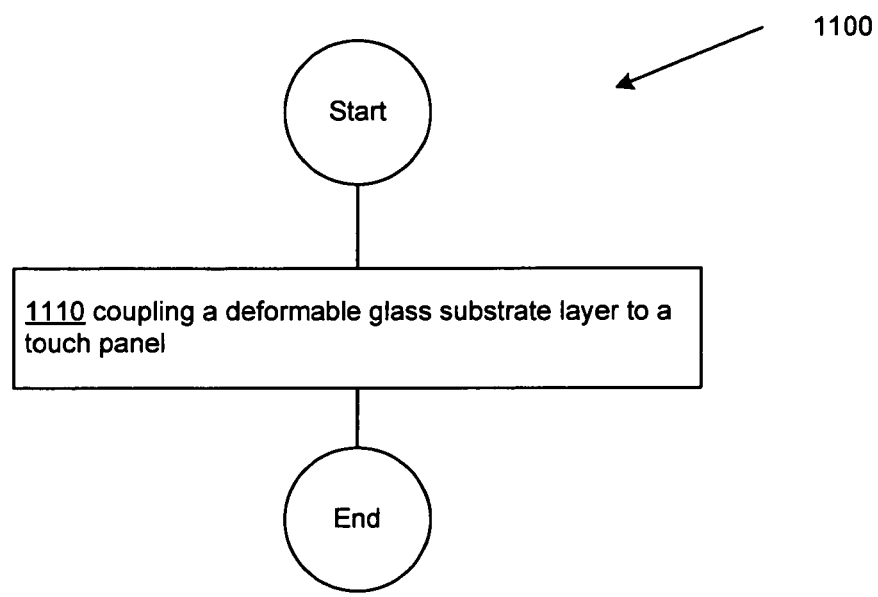
FIG. 11 is a high-level logic flowchart of a process.

FIG. 11 illustrates an operational flow 1100 representing example operations related to rigid-to-rigid lamination of the deformable glass substrate 101 to the touch panel 102 with using a pressure sensitive adhesive. In FIG. 11 and in following figures that include various examples of operational flows, discussion and explanation may be provided with respect to the above-described examples of FIGS. 1-10, and/or with respect to other examples and contexts. However, it should be understood that the operational flows may be executed in a number of other environments and contexts, and/or in modified versions of FIGS. 1-10. Also, although the various operational flows are presented in the sequence(s) illustrated, it should be understood that the various operations may be performed in other orders than those which are illustrated, or may be performed concurrently.

After a start operation, the operational flow 1100 moves to an operation 1110. The operation 1110 illustrates coupling a deformable glass substrate to a touch panel. For example, as shown in FIGS. 1-10, a deformable glass substrate 101 may be coupled to a touch panel 102 so as to provide touch panel system 100 having enhanced optical or durability characteristics.

Figure 12:
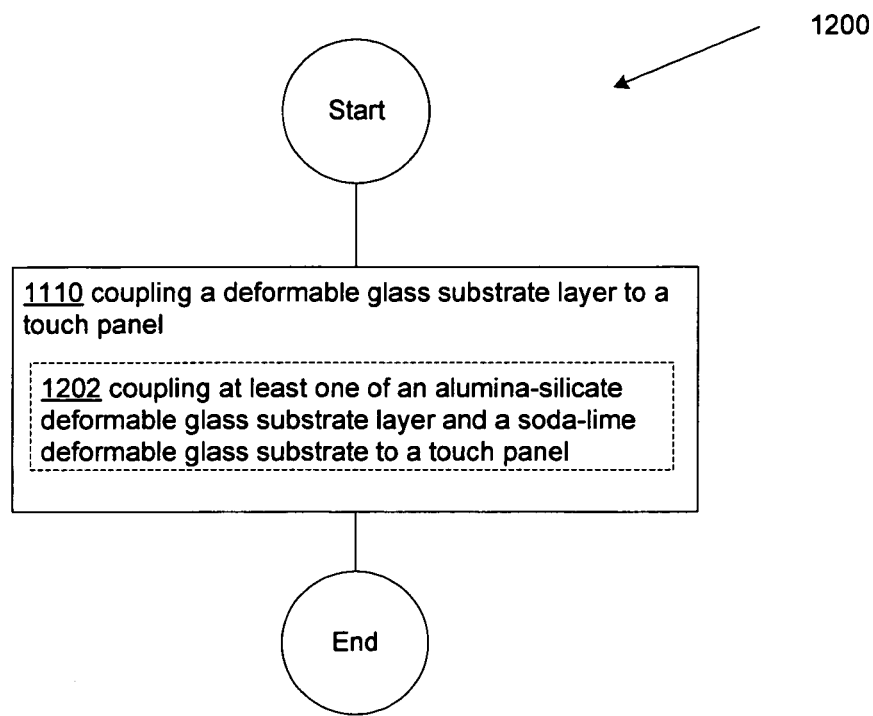
FIG. 12 is a high-level logic flowchart of a process.

FIG. 12 illustrates alternative embodiments of the example operational flow 1100 of FIG. 11. FIG. 12 illustrates example embodiments where the operation 1110 may include at least one additional operation. Additional operations may include an operation 1202.

Figure 13:
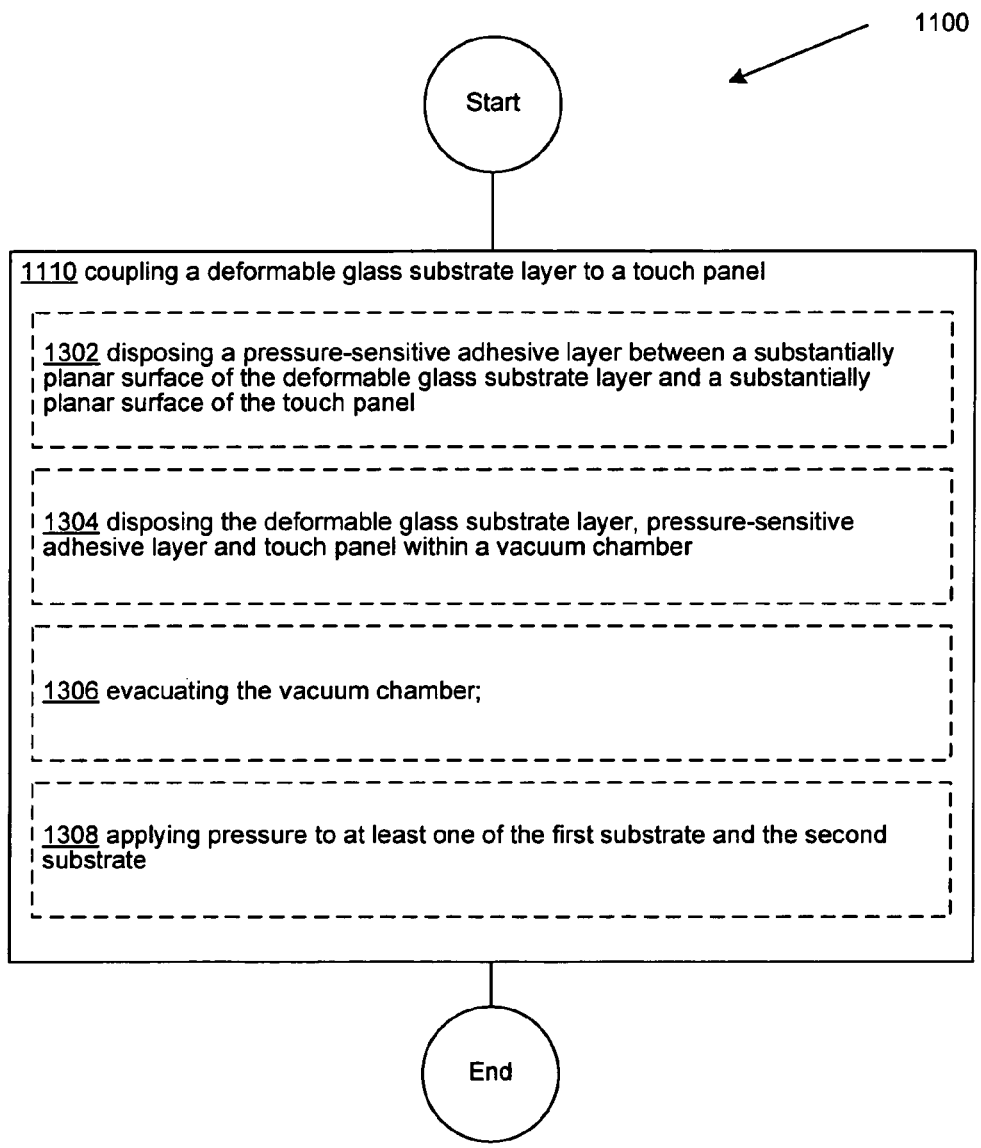
FIG. 13 is a high-level logic flowchart of a process.

FIG. 13 illustrates alternative embodiments of the example operational flow 1100 of FIG. 11. FIG. 13 illustrates example embodiments where the operation 1110 may include at least one additional operation. Additional operations may include an operation 1302, an operation 1304, an operation 1306, and/or an operation 1308.

Operation 1302 illustrates disposing an optically clear adhesive layer between a substantially planar surface of the deformable glass substrate and a substantially planar surface of the touch panel. For example, as shown in FIGS. 1 through 10, the adhesive layer 103 may be disposed between the deformable glass substrate 101 and the touch panel 102. Disposing operation 1302 may be conducted in either a manual fashion (e.g. by an operator) or an automated fashion whereby an automated disposing apparatus (e.g. a robotic arm configured to dispose the adhesive layer 103 between the deformable glass substrate 101 and the touch panel 102) such as those commonly found in the manufacturing arts may be employed.

Operation 1304 illustrates disposing the deformable glass substrate, optically clear adhesive layer and touch panel within a vacuum chamber. For example, as shown in FIGS. 1 through 10, the deformable glass substrate 101, the touch panel 102, and the adhesive layer 103 may be disposed within the vacuum chamber 110. Disposing operation 1304 may be conducted in either a manual fashion (e.g. by an operator) or an automated fashion whereby an automated disposing apparatus (e.g. a robot arm configured to dispose the adhesive layer 103 between the deformable glass substrate 101 and the touch panel 102) such as those commonly found in the manufacturing arts may be employed.

Operation 1306 illustrates evacuating the vacuum chamber. For example, as shown in FIGS. 1 through 10, the vacuum control logic 161 may cause the vacuum pump 170 to evacuate the first compartment 121 of the vacuum chamber 110 via vacuum port 113. During vacuum operation 1306, the vacuum/pressurization port 114 or the inlet of the vacuum pump/compressor 180 may be sealed so as to limit any deformation of the flexible membrane 120 during the evacuation of the vacuum chamber 110.

Operation 1308 illustration applying pressure to at least one of the deformable glass substrate, and the touch panel. For example, as shown in FIGS. 1 through 10, the vacuum/pressurization control logic 162 may cause the vacuum pump/compressor 180 to pressurize the second compartment 122 of the vacuum chamber 110 via vacuum/pressurization port 114. The pressurization of the second compartment 122 may induce a deformation of the flexible membrane 120 in at least the general direction of the deformable glass substrate 101, the touch panel 102, and the adhesive layer 103. Such a deformation may press the deformable glass substrate 101, the touch panel 102, and the adhesive layer 103 together, thereby compressing the adhesive layer 103 so as to laminate the deformable glass substrate 101 and the touch panel 102 to one another.

Figure 14:
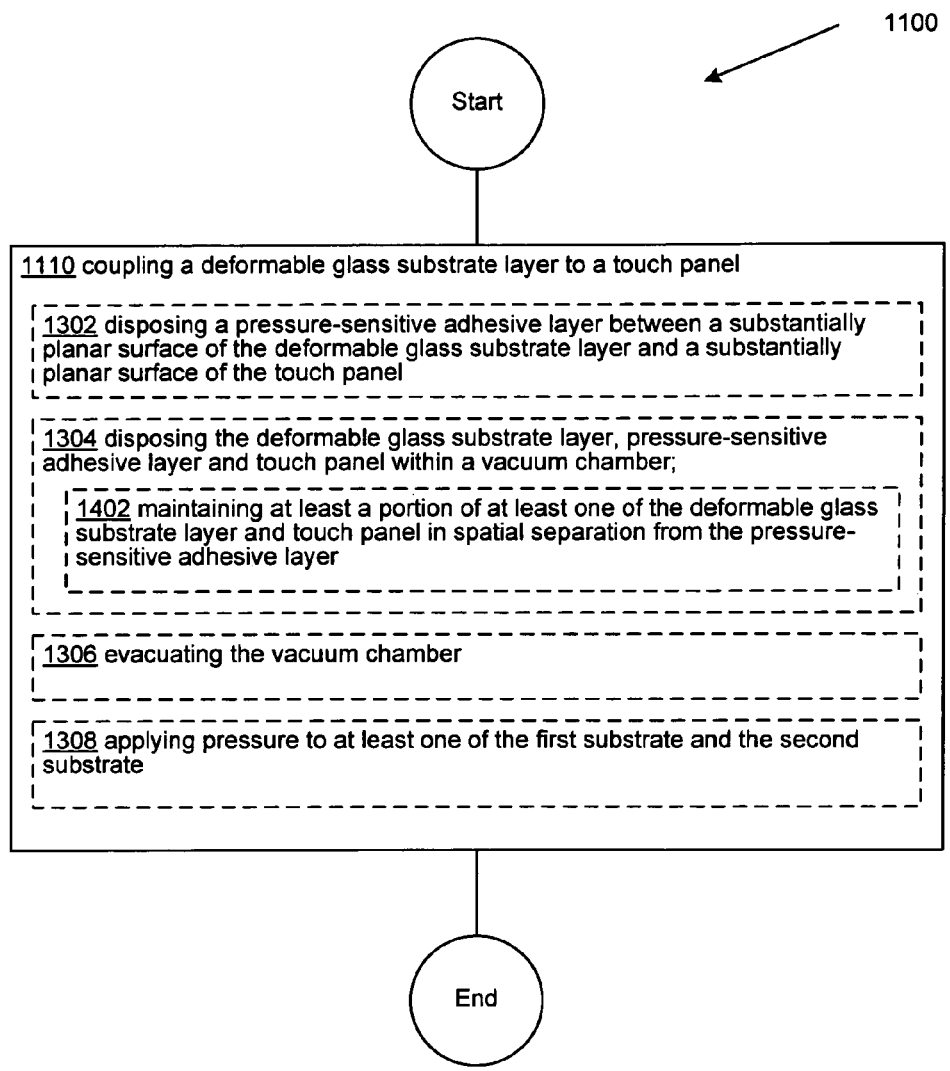
FIG. 14 is a high-level logic flowchart of a process.

FIG. 14 illustrates alternative embodiments of the example operational flow 1100 of FIG. 12. FIG. 14 illustrates example embodiments where the disposing operation 1304 may include at least one additional operation. Additional operations may include an operation 1402.

At the operation 1402, maintaining at least a portion of at least one of the deformable glass substrate and the touch panel in spatial separation from the optically clear adhesive layer may occur. For example, as shown in FIGS. 1 through 10, during the evacuation operation 1306, portions of at least one of the deformable glass substrate 101 and the touch panel 102 may be maintained in spatial separation from the adhesive layer 103 by the substrate support 130 so as to allow for a substantially complete evacuation of air between the deformable glass substrate 101, the touch panel 102 and the adhesive layer 103, thereby limiting the entrainment of air between the deformable glass substrate 101 and the touch panel 102.

Figure 15:
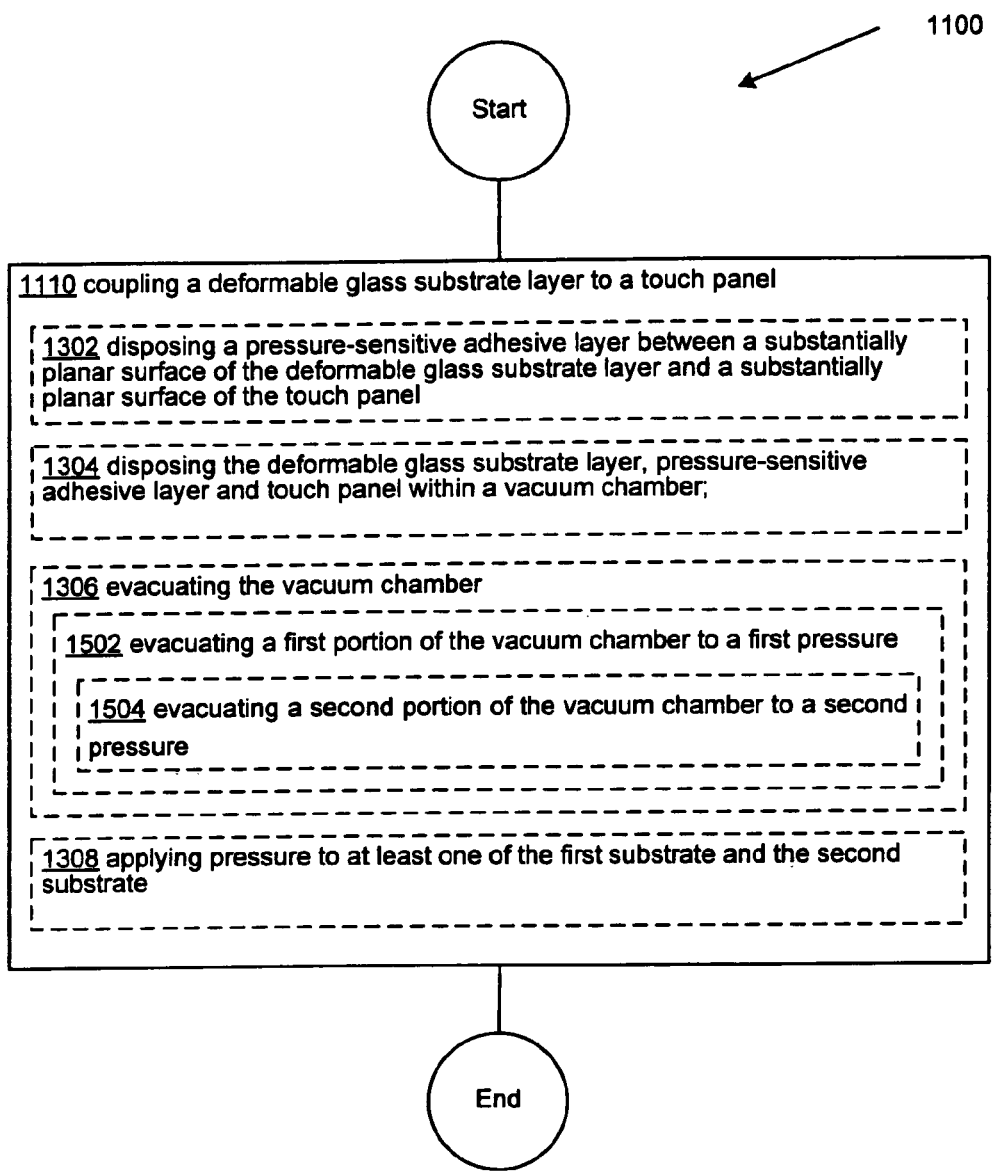
FIG. 15 is a high-level logic flowchart of a process.

FIG. 15 illustrates alternative embodiments of the example operational flow 1100 of FIG. 12. FIG. 15 illustrates example embodiments where the evacuating operation 1306 may include at least one additional operation. Additional operations may include an operation 1402 and/or an operation 1404.

At the operation 1502, evacuating a first portion of the vacuum chamber to a first pressure may occur. For example, as shown in FIGS. 1-7, the second compartment 122 may be evacuated via vacuum/pressurization port 114. The evacuation of the second compartment 122 may occur prior to closing the vacuum chamber lid 112 atop the vacuum chamber body 111 so as to maintain the flexible membrane 120 in close proximity to the vacuum chamber lid 112 and avoid contact between the flexible membrane 120 and at least one of the deformable glass substrate 101 and the touch panel 102 prior to pressure application operation 1308.

At the operation 1504, evacuating a second portion of the vacuum chamber to a second pressure may occur. For example, as shown in FIGS. 1-7, the first compartment 121 may be evacuated via vacuum port 113. The evacuation of the first compartment 121 may occur after closing the vacuum chamber lid 112 atop the vacuum chamber body 111 so as to remove substantially all air from the interior of the first compartment 121. During evacuation operation 1504, a pressure differential may be maintained between the first compartment 121 and the second compartment 122 where the first pressure in the second compartment 122 is lower than the second pressure than the first compartment 121.

Figure 16:
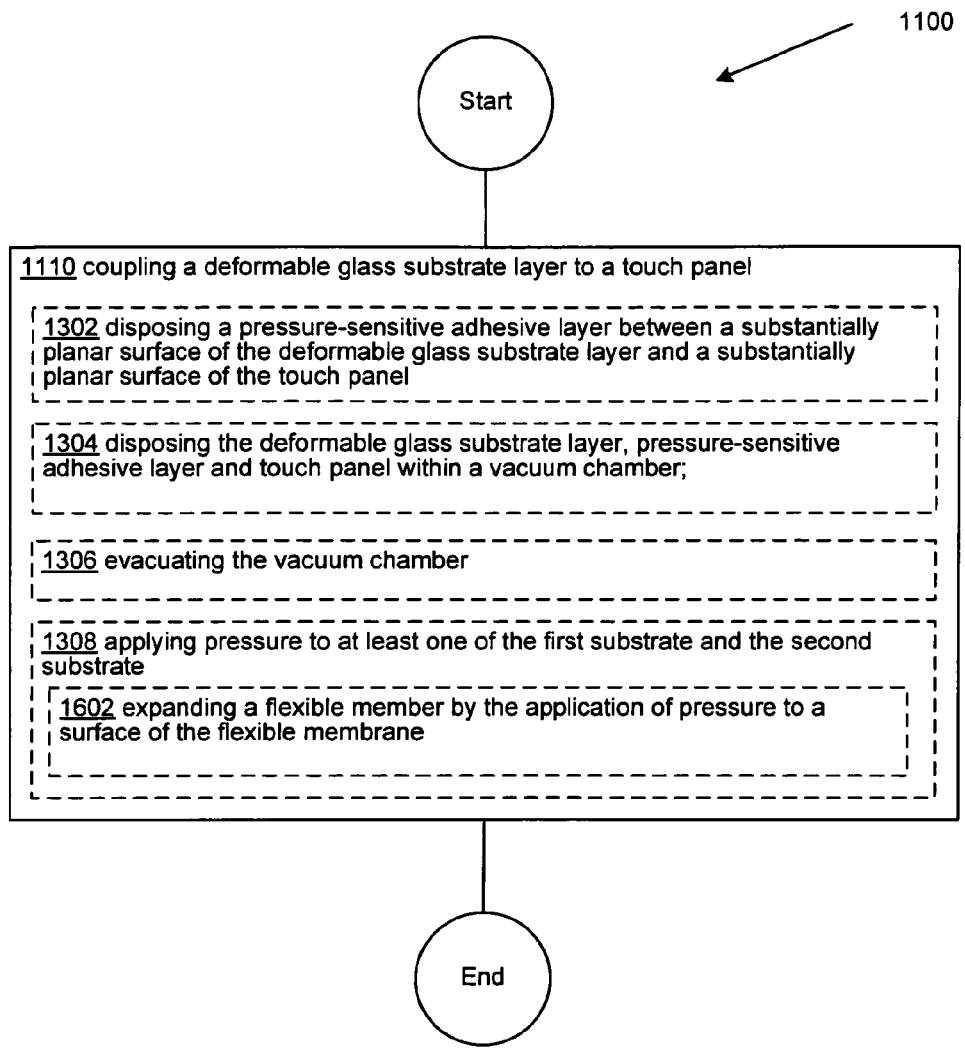
FIG. 16 is a high-level logic flowchart of a process.

FIG. 16 illustrates alternative embodiments of the example operational flow 1100 of FIG. 13. FIG. 16 illustrates example embodiments where the pressure application operation 1308 may include at least one additional operation. Additional operations may include an operation 1602.

At the operation 1602, expanding a flexible member by the application of pressure to a surface of the flexible membrane may occur. For example, as shown in FIGS. 1 through 10, a pressure may be exerted on the surface of the flexible membrane 120 facing the second compartment 122.

In particular applications, a differential pressure between an evacuated first compartment 121 and a pressurized second compartment 122 of from about 20 to 7600 torr and, more particularly, about 760 torr may be desirable. However, the amount of pressure applied to the second compartment 122 and the corresponding expansion of the flexible membrane 120 may be a function of the pressure required to effectively attach a selected adhesive layer 103 or the sensitivity of the deformable glass substrate 101 and the touch panel 102, as would be determinable by one of skill in the art. As such, any range of differential pressures between the first compartment 121 and the second compartment 122 is fully contemplated by this disclosure.

Figure 17:
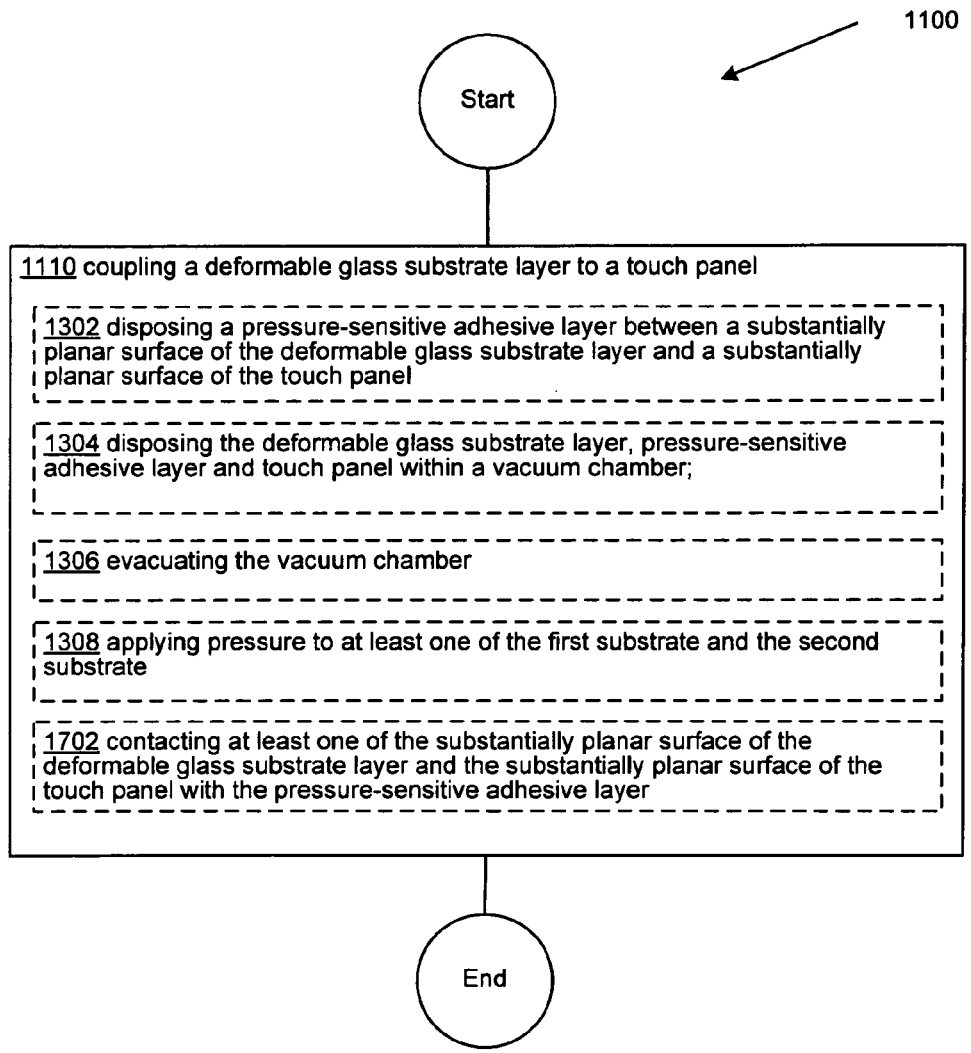
FIG. 17 is a high-level logic flowchart of a process.

FIG. 17 illustrates alternative embodiments of the example operational flow 1100 of FIG. 13. FIG. 17 illustrates an example embodiment where the example operational flow 1100 of FIG. 13 may include at least one additional operation. Additional operations may include an operation 1708.

After a start operation, a disposing operation 1302, a disposing operation 1304, an evacuation operation 1306, and an applying operation 1308, the operational flow 1100 moves to a contacting operation 1702. The operation 1702 illustrates contacting at least one of the substantially planar surface of the deformable glass substrate and the substantially planar surface of the touch panel with the optically clear adhesive layer. For example, as shown in FIGS. 1 through 10, at least one of the deformable glass substrate 101 and the touch panel 102 may be moved from a supported position where at least one of the deformable glass substrate 101 and the touch panel 102 is maintained in spatial separation from the adhesive layer 103 to a contacted position where at least one of the deformable glass substrate 101 and the touch panel 102 is brought into physical contact with the adhesive layer 103.

Figure 18:
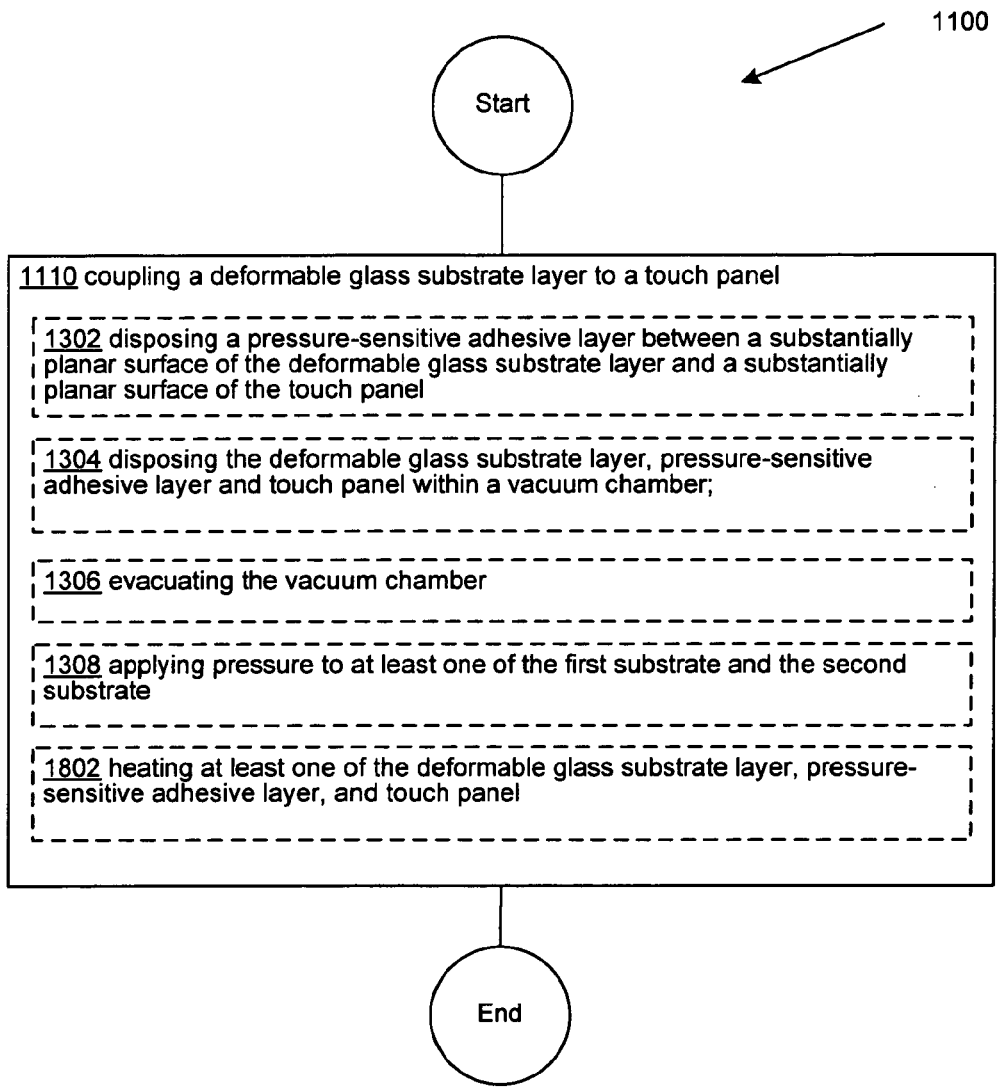
FIG. 18 is a high-level logic flowchart of a process.

FIG. 18 illustrates alternative embodiments of the example operational flow 1100 of FIG. 13. FIG. 18 illustrates an example embodiment where the example operational flow 1100 of FIG. 13 may include at least one additional operation. Additional operations may include an operation 1802.

The operation 1802 illustrates heating at least one of the deformable glass substrate layer, optically clear adhesive layer, and touch panel. For example, as shown in FIGS. 1 through 10, the deformable glass substrate 101, the touch panel 102 and the adhesive layer 103 may be heated by a heating element internal to the vacuum chamber 110 or disposed within an external heating apparatus, such as an autoclave. Such heating may serve to further set the adhesive layer 103. In particular applications, the heating may occur in an environment having a temperature of from about ambient to 200° C. and, more particularly, about 80° C. Operation 1802 may be conducted over a period of time of from about 2 to 5 hours. However, the amount of heat and pressure applied and the timing therefore may be a function of the heat and pressure required to effectively attach a selected adhesive layer 103 or the sensitivity of the deformable glass substrate 101 and the touch panel 102 to heat and/or pressure, as would be determinable by one of skill in the art. As such, any range of temperatures and pressures is fully contemplated by this disclosure.

Figure 19:
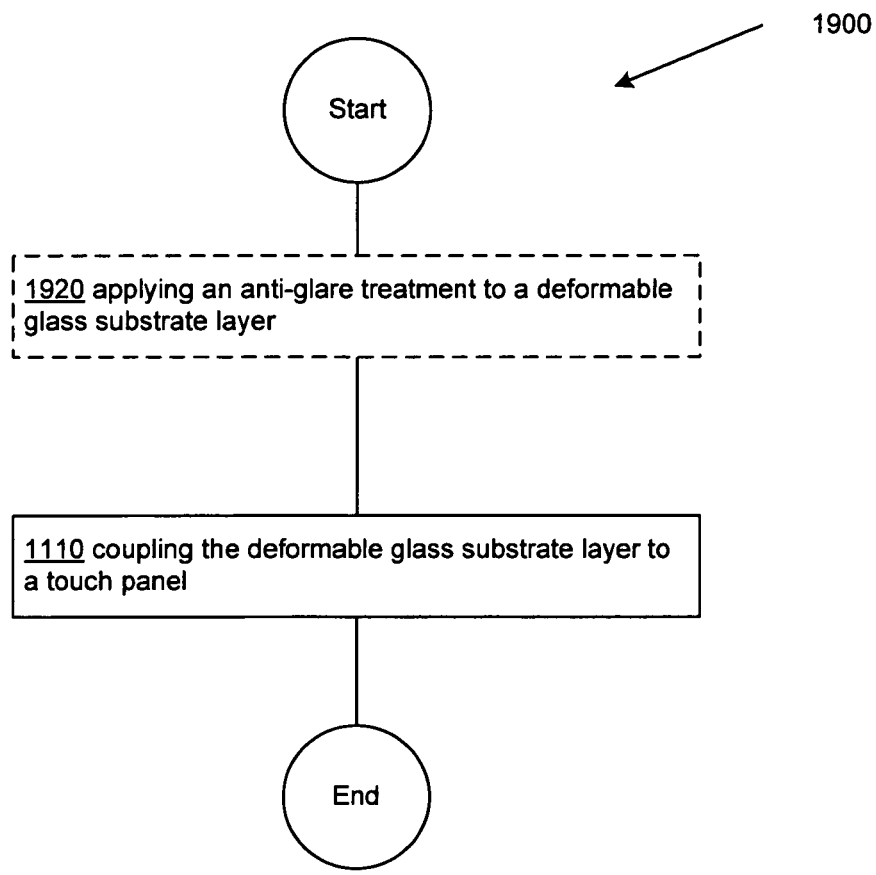
FIG. 19 is a high-level logic flowchart of a process.

FIG. 19 illustrates an operational flow 1900 representing example operations related to lamination of a touch screen and a deformable glass substrate. FIG. 19 illustrates an example embodiment where the example operational flow 1100 of FIG. 11 may include at least one additional operation. Additional operations may include an operation 1920.

The operation 1902 illustrates applying an anti-glare treatment to the deformable glass substrate. For example, as shown in FIGS. 1 through 10, an anti-glare treatment 204 may be applied to the deformable glass substrate 101. The anti-glare treatment 204 may be a texturizing treatment of a surface of the deformable glass substrate 101. The texturing anti-glare treatment 204 of the deformable glass substrate 101 may include etching process. The anti-glare treatment 204 of the deformable glass substrate 101 may be less than or equal to approximately 1.1 millimeters thick. However, any thickness of anti-glare treatment 204 may be used.

Figure 20:
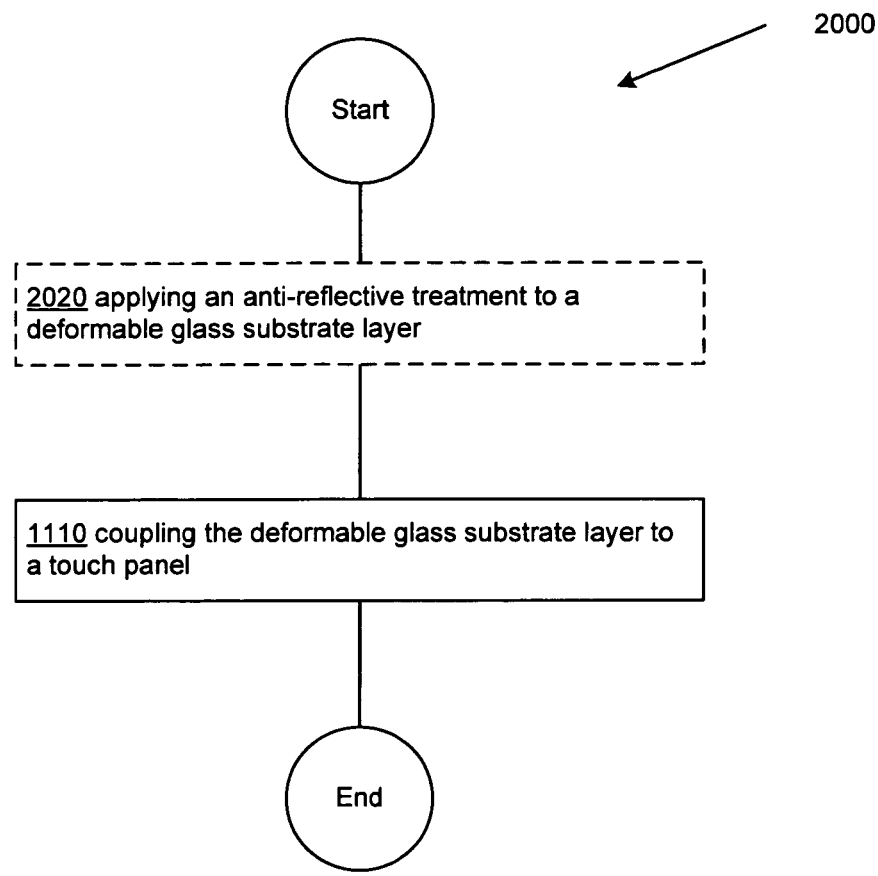
FIG. 20 is a high-level logic flowchart of a process.

FIG. 20 illustrates an operational flow 2000 representing example operations related to lamination of a touch screen and a deformable glass substrate. FIG. 20 illustrates an example embodiment where the example operational flow 1100 of FIG. 11 may include at least one additional operation. Additional operations may include an operation 2020.

The operation 2020 illustrates applying an anti-reflective treatment to the deformable glass substrate. For example, as shown in FIGS. 1 through 10, an anti-reflective treatment 205 the anti-reflective treatment 205 may include a Magnesium Fluoride (MgF2) or Silicone Dioxide (SiO2) layer. The anti-reflective treatment 205 may be applied to the deformable glass substrate 101 by numerous processes. For example, the anti-reflective treatment 205 may be applied to the deformable glass substrate 101 by a chemical vapor deposition process.

Figure 21:
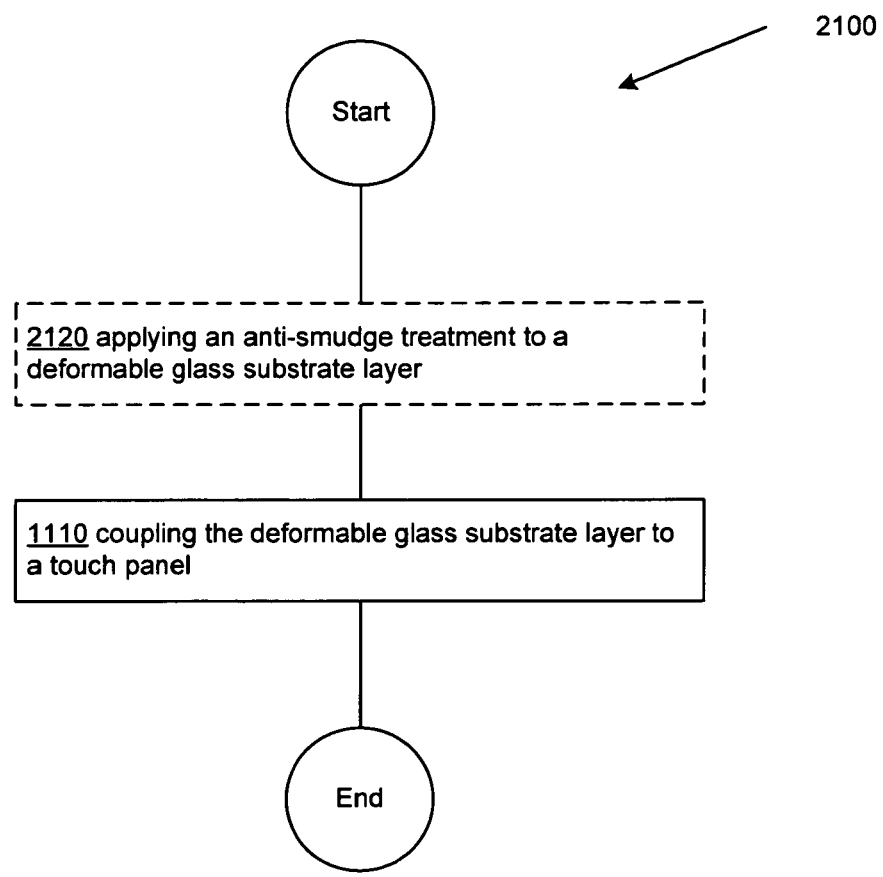
FIG. 21 is a high-level logic flowchart of a process.

FIG. 21 illustrates an operational flow 2100 representing example operations related to lamination of a touch screen and a deformable glass substrate. FIG. 21 illustrates an example embodiment where the example operational flow 1100 of FIG. 11 may include at least one additional operation. Additional operations may include an operation 2120.

The operation 1902 illustrates applying an anti-smudge treatment to the deformable glass substrate. For example, the anti-smudge treatment 206 may include a hydrophobic coating and/or an oleophobic coating. The anti-smudge treatment 206 may be applied by numerous processes. For example, the anti-smudge treatment 206 may be applied by spin coating, dip coating, chemical vapor deposition, and the like.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the process can be rearranged while remaining within the disclosed subject matter. The accompanying process claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
a first compartment configured to contain:
a touch screen including a visually observable display screen layer and a touch sensing layer;
a deformable glass substrate for protecting the touch screen from premature wear due to at least one of a repeated interfaces and contact with harmful fluids;
a pressure-sensitive adhesive layer for coupling the touch screen to the deformable glass substrate by contact with the touch screen and the deformable glass substrate;
a substrate support for maintaining a spatial separation between a portion of the pressure-sensitive adhesive layer and at least one of the deformable glass substrate or the touch screen while air is substantially evacuated from between the pressure-sensitive adhesive layer and the at least one of the deformable glass substrate or the touch screen;
a first pump coupled to the first compartment, the first pump being configured to substantially evacuate air from the first compartment;
a flexible membrane defining a portion of a second compartment adjacent to the first compartment; and
a second pump coupled to the second compartment, the second pump being configured to pressurize the second compartment to expand the flexible membrane in the direction of the touch screen, the deformable glass substrate, and the pressure sensitive adhesive layer, thereby compressing the pressure sensitive adhesive layer between the touch screen and the deformable glass substrate.

2. The system of claim 1, further comprising:
at least one treatment applied to the deformable glass substrate.

3. The system of claim 2, wherein the treatment comprises:
an anti-glare treatment.

4. The system of claim 2, wherein the treatment comprises:
an anti-reflective treatment.

5. The system of claim 2, wherein the treatment comprises:
an anti-smudge treatment.

6. The system of claim 1, wherein the deformable glass substrate comprises at least one of an alumina-silicate glass and a soda-lime glass.

7. The system of claim 1, further comprising:
an optically clear adhesive layer operably coupling the deformable glass substrate and the touch screen.

8. The system of claim 1, further comprising:
an anti-glare treatment layer disposed on the deformable glass substrate layer;
an anti-reflective layer disposed on the anti-glare treatment layer; and
an anti-smudge layer disposed on the anti-glare treatment layer.

9. The system of claim 1, wherein the touch screen comprises:
a polarization layer disposed on the exterior surface of the touch screen,
wherein the deformable glass substrate is configured to be coupled to a surface of the polarization layer of the touch screen by the pressure-sensitive adhesive layer.

10. The system of claim 1, wherein the pressure sensitive adhesive layer comprises:
at least one cured-state polymer-based pressure sensitive adhesive.

11. The system of claim 1, wherein the pressure sensitive adhesive layer comprises:
at least one of an acrylic or silicone based polymer.

12. The system of claim 1, wherein the deformable glass substrate is configured to be coupled to an exterior surface of the touch screen, wherein the exterior surface of the touch screen comprises the visually observable display screen layer, thereby enabling the touch screen to receive interfaces to the visually observable display screen layer and the touch sensing layer indirectly via contact with the deformable glass substrate.

13. The system of claim 1, wherein the substrate support comprises:
a retractable support pin; and
an actuating mechanism coupled to the retractable support pin, the actuating mechanism being configured to translate the retractable support pin in and out of contact with the at least one of the deformable glass substrate or the touch screen.

14. The system of claim 1, further comprising:
a substrate alignment insert for contacting at least a portion of the deformable glass substrate and at least a portion of the touch screen to align the deformable glass substrate with the touch screen during evacuation of the air from between the pressure-sensitive adhesive layer and the at least one of the deformable glass substrate or the touch screen.

15. The system of claim 1, further comprising:
a substrate mask for covering at least a portion of the touch screen to protect the touch screen from damage during evacuation of the air from between the pressure-sensitive adhesive layer and the at least one of the deformable glass substrate or the touch screen.

16. The system of claim 15, wherein the substrate mask is further configured to prevent electrostatic discharge during evacuation of the air from between the pressure-sensitive adhesive layer and the at least one of the deformable glass substrate or the touch screen.

17. The system of claim 15, further comprising:
at least one substrate alignment guide for contacting at least a portion of the substrate mask and at least a portion of the touch screen to align an aperture of the substrate mask with the touch screen during evacuation of the air from between the pressure-sensitive adhesive layer and the at least one of the deformable glass substrate or the touch screen.

* * * * *